US006716930B2

(12) United States Patent
Yanagida et al.

(10) Patent No.: US 6,716,930 B2
(45) Date of Patent: Apr. 6, 2004

(54) METHOD FOR PROCESSING ETHYLENE-VINYL ALCOHOL COPOLYMER SOLUTION

(75) Inventors: Noboru Yanagida, Okayama (JP); Masafumi Mikami, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 149 days.

(21) Appl. No.: 09/922,692

(22) Filed: Aug. 7, 2001

(65) Prior Publication Data

US 2002/0026007 A1 Feb. 28, 2002

(30) Foreign Application Priority Data

Aug. 7, 2000 (JP) ........................................ 2000-238364

(51) Int. Cl.⁷ ................................................. C08F 6/10
(52) U.S. Cl. ............................... 525/330.6; 525/330.3; 525/61; 525/60; 523/318; 523/324; 523/348; 524/379; 524/557
(58) Field of Search .......................... 525/330.6, 330.3, 525/61, 60; 523/318, 324, 348; 524/379, 557

(56) References Cited

U.S. PATENT DOCUMENTS

| 2,779,752 A | 1/1957 | Vining |
| 3,816,379 A | 6/1974 | Rosenbaum et al. |
| 3,847,845 A | 11/1974 | Tada et al. |
| 4,611,029 A | 9/1986 | Takahashi |
| 5,288,925 A | 2/1994 | Poindexter |
| 5,302,417 A | 4/1994 | Yamauchi et al. |
| 6,184,288 B1 | 2/2001 | Ninomiya et al. |
| 6,288,165 B1 * | 9/2001 | Moritani et al. ............... 525/59 |

FOREIGN PATENT DOCUMENTS

| DE | 24 27 529 | 1/1976 | |
| EP | 0 937 557 A1 | 8/1999 | |
| FR | 1 241 689 | 12/1960 | |
| FR | 2 192 195 | 2/1974 | |
| GB | 1 033 395 | 6/1966 | |
| JP | 58122903 A * | 7/1983 | ............. C08F/8/12 |
| WO | WO 96/34897 | 11/1996 | |

* cited by examiner

Primary Examiner—David W. Wu
Assistant Examiner—Satya Sastri
(74) Attorney, Agent, or Firm—Oblon, Spivak, McClelland, Maier & Neustadt, P.C.

(57) ABSTRACT

A method for processing a solution of ethylene-vinyl alcohol copolymer in a solvent other than water, which involves continuously substituting a part of the solvent in the solution with water to produce a high-concentration ethylene vinyl alcohol copolymer solution without gelling, whereby an ethylene-vinyl alcohol copolymer solution is fed into a column vessel selected from a plate column and a packed column, and a part of the solvent in the solution is substituted with water in the column vessel.

41 Claims, No Drawings

METHOD FOR PROCESSING ETHYLENE-VINYL ALCOHOL COPOLYMER SOLUTION

BACKGROUND OF THE INVENTION

1. Field of the Invention

The present invention relates to a method for processing an ethylene-vinyl alcohol copolymer (EVOH) solution. More precisely, it relates to a method for processing an EVOH solution, which comprises feeding the solution into a column vessel selected from a plate column and a packed column to thereby substitute a part of the solvent in the solution with water in the column vessel.

2. Discussion of the Background

As having good oxygen gas barrier properties, EVOH is used as a starting material for producing packaging films and bottles for various foods. One general method of producing EVOH comprises copolymerizing ethylene with vinyl acetate to give an ethylene-vinyl acetate copolymer followed by saponifying the ethylene-vinyl acetate copolymer in a solvent of methanol in the presence of an alkali catalyst. In this, the saponification is effected under a predetermined pressure and at a predetermined temperature, and the saponified product is obtained in the form of a methanol solution thereof. When a part of methanol in the methanol solution of the saponified product is substituted with water, then the solution can be handled with ease even under atmospheric pressure at a relatively low temperature, and its stability is improved, and, in addition, it can be coagulated into strands. With that, high-quality EVOH products are produced efficiently.

For post-treating the alcohol solution of EVOH obtained through saponification, for example, Japanese Patent Publication No. 38634/1972 (U.S. Pat. No. 3,847,845) discloses a method of producing EVOH pellets which comprises adding water to an optionally-concentrated methanol solution of EVOH to such a degree that no EVOH deposit is formed therein to prepare a methanol-water mixed solution of EVOH that contains from 15 to 45% by weight of EVOH, then extruding it into strands in water or in a methanol-water mixed solution having a lower methanol concentration than the EVOH solution, at 50° C. or lower, and thereafter cutting the strands. It is stated therein that the methanol concentration in the methanol-water mixed solution in the coagulating bath preferably is between 10 and 50% by weight. It is further stated therein that the pellets thus obtained are porous and can be readily washed with water to remove the saponification catalyst residue and that the pellets are easy to handle in the subsequent washing and drying step.

For substituting a large amount of methanol in a methanol solution of EVOH with water, a large amount of water, relative to the amount of methanol in the solution, must be added to the solution. However, the solubility of EVOH in methanol and in water is limited, and depends on the temperature and pressure. Therefore, if too much water is added to the methanol solution of EVOH, the solution will gel. On the other hand, if the amount of water added to the solution is too small, EVOH could not be in the form of a solution thereof, and methanol in the solution could not be substituted with water. For substituting a part of methanol in a methanol solution of EVOH with water, simple distillation or flushing is generally employed.

Regarding the process of adding water to a methanol solution of the EVOH after saponification, for example, demonstrated in Example 1 of Japanese Patent Laid-Open No. 90927/1999 (EP 937,557) is a method of producing a completely transparent, uniform methanol/water solution of EVOH, which comprises adding an aqueous methanol solution having a water content of 62.5% by weight to a methanol solution of EVOH having an EVOH content of 30% by weight, under an azeotropic condition at 100° C. to 110° C. under a pressure of 3 kg/cm² G so as to remove methanol until the EVOH content of the resulting the EVOH solution increases up to 40% by weight. However, EVOH often gels while processed according to the method, and therefore could not be continuously processed according to it. For these reasons, the method is not advantageous for industrially processing EVOH.

SUMMARY OF THE INVENTION

If a part of the solvent in an EVOH solution can be continuously substituted with water without gelling, the method is advantageous for industrially processing EVOH. Accordingly, the object of the present invention is to provide a method for processing an EVOH solution capable of producing a high-concentration EVOH solution by substituting a part of the solvent in the EVOH solution with water without gelling.

We, the present inventors have assiduously studied, and have found that, when a part of the solvent in an ethylene-vinyl alcohol copolymer solution is substituted with water in a column vessel, then the above-mentioned object can be attained. On the basis of this finding, we have completed the invention. Specifically, the invention is a method for processing an ethylene-vinyl alcohol copolymer solution, which comprises feeding the solution into a column vessel selected from a plate column and a packed column to thereby substitute a part of the solvent in the solution with water in the column vessel.

Preferably, the column vessel is a plate column with at least two tiers therein or a packed column of which the height is equivalent to that of the plate column. Also preferably, a solvent-water mixed vapor is fed into the plate column or the packed column through its lower part, and the ethylene-vinyl alcohol copolymer solution is fed thereinto through a part higher than the part through which the mixed vapor is fed into the column. More preferably, the part through which the ethylene-vinyl alcohol copolymer solution is fed into the column vessel is at the 2nd to the 15th tier from the bottom of a plate column, or at a height of a packed column equivalent to that part of the plate column.

Also preferably, the ethylene-vinyl alcohol copolymer concentration in the solution to be fed into the column vessel is between 15 and 50% by weight, more preferably between 25 and 40% by weight. Also preferably, the ratio by weight of the amount of the ethylene-vinyl alcohol copolymer solution to be fed into the column vessel to that of the mixed vapor thereinto, i.e., solution/mixed vapor, is between 100/400 and 100/8. More preferably, the water content of the mixed vapor is between 20 and 70% by weight.

Also preferably, the ethylene content of the ethylene-vinyl alcohol copolymer is between 3 and 70 mol %. Also preferably, the solvent in the ethylene-vinyl alcohol copolymer solution is an alcohol having a boiling point of not higher than 130° C., more preferably methanol.

DETAILED DESCRIPTION OF THE INVENTION

In general, the ethylene-vinyl alcohol copolymer for use in the invention is obtained by saponifying an ethylene-vinyl ester copolymer prepared through copolymerization of ethylene with a vinyl ester of a fatty acid such as vinyl acetate, in an organic solvent containing an alcohol in the presence of a saponification catalyst. The vinyl ester of a fatty acid includes, for example, vinyl formate, vinyl acetate, vinyl propionate, vinyl valerate, vinyl caprate, vinyl laurate and vinyl stearate. From the viewpoint of industrial advantages, saponified products of ethylene-vinyl acetate copolymer are preferred for use in the invention.

The ethylene content of the ethylene-vinyl alcohol copolymer preferably is between 3 and 70 mol %. If the ethylene content is smaller than 3 mol %, the melt moldability of the copolymer is often poor. More preferably, the ethylene content is at least 20 mol %, even more preferably at least 30 mol %. On the other hand, if the ethylene content is larger than 70 mol %, the gas barrier properties of the copolymer are often not good. More preferably, the ethylene content is at most 60 mol %, even more preferably at most 50 mol %. The degree of saponification is preferably at least 90 mol % for ensuring better gas barrier properties of the products. More preferably, the degree of saponification is at least 98 mol %, even more preferably at least 99 mol %.

The ethylene-vinyl alcohol copolymer may be further copolymerized with other comonomers not interfering with the effect of the invention. The comonomers include, for example, unsaturated carboxylic acids such as (meth)acrylic acid, crotonic acid, itaconic acid and maleic anhydride and their mono or di-alkyl esters; nitrites such as (meth) acrylonitrile; amides such as (meth)acrylamide; olefinsulfonic acids such as ethylenesulfonic acid and (meth) allylsulfonic acid, and their salts; alkyl vinyl ethers, polyoxyalkyl allyl ethers, allyl esters, vinyl ketones, N-methylpyrrolidone, vinylidene chloride, vinylidene fluoride, oxyalkylene-containing unsaturated vinyl monomers, and vinylalkoxysilanes.

The most characteristic feature of the method for processing an ethylene-vinyl alcohol copolymer solution of the invention is that the method is effected in a column vessel selected from a plate column and a packed column. The plate column includes, for example, porous plate columns and bubble-cap towers that are generally used for distillation. The packed column includes, for example, those filled with various fillers such as raschig rings that are used for distillation or absorption. Preferably, the plate column has at least two tiers. Also preferably, the packed column has a height equivalent to that of the plate column. The number of tiers in the plate column referred to herein is the actual number thereof; and the height of the packed column which is equivalent to that of the plate column is obtained by multiplying the number of transfer units in the packed column by the height of transfer unit. The material of the columns is not specifically limited, but, in general, preferred are stainless columns in view of their corrosion resistance.

For substituting the solvent in an ethylene-vinyl alcohol copolymer solution with water in the invention, the solution and a solvent-water mixed vapor are fed into the column vessel as above. In this method, it is desirable that the solvent-water mixed vapor is fed into the plate column or the packed column through its lower part and the ethylene-vinyl alcohol copolymer solution is fed thereinto through a part higher than the part through which the mixed vapor is fed into the column. In that manner, the two are contacted with each other in countercurrent flow, therefore enabling efficient substitution of the solvent in the copolymer solution with water. The lower part of the column is meant to indicate the part of about 1/3 thereof from the lowermost tier or the bottom of the column. Preferably, the solvent-water mixed vapor is fed into the column at its lowermost tier. Where a plate column having a large number of tiers therein or a packed column of which the height is equivalent to that of the plate column is used, the ethylene-vinyl alcohol copolymer solution is fed thereinto preferably at the 2nd to the 15th tier from the bottom of the plate column, more preferably at the 4th to 11th tier from the bottom thereof, or at a height of the packed column equivalent to that part of the plate column.

Preferably, the ethylene-vinyl alcohol copolymer concentration in the ethylene-vinyl alcohol copolymer solution to be fed into the column vessel is between 15 and 50% by weight for carrying out the method of the invention on an industrial scale. If the copolymer concentration is smaller than 15% by weight, the productivity of the method will be low and the production costs thereof will increase. More preferably, the copolymer concentration is at least 20% by weight, even more preferably at least 25% by weight. If, however, the copolymer concentration is higher than 50% by weight, the copolymer will often gel. More preferably, the copolymer concentration is at most 40% by weight, even more preferably at most 35% by weight.

Also preferably, the ratio by weight of the amount of the ethylene-vinyl alcohol copolymer solution to be fed into the column vessel to that of the solvent-water mixed vapor thereinto, solution/mixed vapor, is between 100/400 and 100/8, as it ensures better results. If the ratio is smaller than 100/400, the composition and the concentration of the copolymer solution will vary rapidly, and, as a result, the copolymer solution will gel at the site at which the mixed vapor is fed into the column vessel. On the other hand, if the ratio is larger than 100/8, the amount of water in the mixed vapor will have to be increased to ensure a good amount of the copolymer solution to be processed, and, as a result, the copolymer solution will also gel at the site at which the mixed vapor is fed into the column vessel.

Also preferably, the water content of the mixed vapor is between 20 and 70% by weight. If it is smaller than 20% by weight, the amount of the mixed vapor to be fed into the column vessel will have to be increased in order to ensure a good amount of the copolymer solution to be processed, but it will increase the production costs. On the other hand, if the water content is larger than 70% by weight, the composition of the copolymer solution will vary rapidly, and, as a result, the copolymer solution will gel at the site at which the mixed vapor is fed into the column vessel. More preferably, the water content of the mixed vapor is at most 60% by weight.

The solvent for use in the invention is preferably an alcohol having a boiling point of not higher than 130° C. More preferably, the boiling point is not higher than 100° C. The alcohol includes, for example, methanol, ethanol, propanol and butanol. Above all, preferred is methanol, as it is easily available and inexpensive, and has a low boiling point and is therefore easy to handle.

Where methanol is used as the solvent in the method of the invention and where an ethylene-vinyl alcohol copolymer solution having a concentration of from 25 to 35% by weight is fed into a plate column at the 4th to 11th tier from its bottom or into a packed column at a height equivalent to that part of the plate column, the ratio by weight, X, of the amount of the ethylene-vinyl alcohol copolymer solution to be fed into the column vessel to that of the solvent-water mixed vapor thereinto, solution/mixed vapor, preferably is within a range of $(-147.3/X)+103.7<Y<(-64.5/X)+128$ with $20 \leq Y \leq 70$, in which Y (wt. %) indicates the water content of the mixed vapor, as it ensures better results. More preferably, $Y \leq 60$.

For processing an ethylene-vinyl alcohol copolymer solution in a plate column or a packed column according to the method of the invention, a solvent-water mixed vapor is fed into the column through its lower part while the ethylene-vinyl alcohol copolymer solution is fed thereinto through a part higher than the part through which the mixed vapor is fed into the column, whereby the ethylene-vinyl alcohol copolymer solution is contacted with the mixed vapor in countercurrent flow in the column so as to substitute a part of the solvent in the ethylene-vinyl alcohol copolymer solution with water. In this process, a mixture of the solvent and water is removed from the column through its top, and a paste of the ethylene-vinyl alcohol copolymer solution that comprises the copolymer, water and the solvent is taken out of the column through its bottom. The solvent-water mixture thus led out of the column through its top may be purified and recycled, if desired. The pressure and the temperature in the system may vary, depending on the type of the alcohol used. In general, however, the pressure may fall between 1 and 5 kg/cm$^2$ or so, and the temperature may fall between 40° C. and 160° C. or so.

EXAMPLES

Having generally described this invention, a further understanding can be obtained by reference to certain specific examples which are provided herein for purposes of illustration only and are not intended to be limiting unless otherwise specified.

Example 1

Ethylene was copolymerized with vinyl acetate, and then saponified to prepare a methanol solution of ethylene-vinyl alcohol copolymer having an ethylene content of 32 mol %, a degree of polymerization of 1080 and a degree of saponification of 100 mol % (the ethylene-vinyl alcohol copolymer content of the solution was 31% by weight). This is a starting paste in this Example. The paste was fed into a 13-tier plate column at the 4th tier from its bottom, and a methanol-water mixed vapor was fed thereinto at the lowermost tier. The water content, Y, of the mixed vapor was 45% by weight; and the ratio by weight, X, of the ethylene-vinyl alcohol copolymer-methanol solution fed into the column to the methanol water mixed vapor thereinto was 0.85. With the mixed vapor under a pressure of 1.1 kg/cm$^2$, methanol in the copolymer solution was substituted with water. Through the process, the ethylene-vinyl alcohol copolymer did not gel in the plate column, and the intended ethylene-vinyl alcohol copolymer solution was continuously taken out of the column. After the solvent therein was substituted with water, the ethylene-vinyl alcohol copolymer concentration in the resulting solution was 40.5% by weight, and the ratio by weight of water/methanol in the solution was 1.20.

Example 2

The paste prepared in the same manner as in Example 1 was fed into a 13-tier plate column at the 6th tier from its bottom, and a methanol-water mixed vapor was fed thereinto at the lowermost tier. The water content, Y, of the mixed vapor was 35% by weight; and the ratio by weight, X, of the ethylene-vinyl alcohol copolymer-methanol solution fed into the column to the methanol-water mixed vapor thereinto was 0.92. With the mixed vapor under a pressure of 1.1 kg/cm$^2$, methanol in the copolymer solution was substituted with water. Through the process, the ethylene-vinyl alcohol copolymer did not gel in the plate column, and the intended ethylene-vinyl alcohol copolymer solution was continuously taken out of the column. After the solvent therein was substituted with water, the ethylene-vinyl alcohol copolymer concentration in the resulting solution was 40.1% by weight, and the ratio by weight of water/methanol in the solution was 1.01.

Example 3

The paste prepared in the same manner as in Example 1 was fed into a 13-tier plate column at the 8th tier from its bottom, and a methanol-water mixed vapor was fed thereinto at the lowermost tier. The water content, Y, of the mixed vapor was 40% by weight; and the ratio by weight, X, of the ethylene-vinyl alcohol copolymer-methanol solution fed into the column to the methanol-water mixed vapor thereinto was 1.21. With the mixed vapor under a pressure of 1.1 kg/cm$^2$, methanol in the copolymer solution was substituted with water. Through the process, the ethylene-vinyl alcohol copolymer did not gel in the plate column, and the intended ethylene-vinyl alcohol copolymer solution was continuously taken out of the column. After the solvent therein was substituted with water, the ethylene-vinyl alcohol copolymer concentration in the resulting solution was 41.2% by weight, and the ratio by weight of water/methanol in the solution was 1.26.

Example 4

The paste prepared in the same manner as in Example 1 was fed into a 13-tier plate column at the 10th tier from its bottom, and a methanol-water mixed vapor was fed thereinto at the lowermost tier. The water content, Y, of the mixed vapor was 50% by weight; and the ratio by weight, X, of the ethylene-vinyl alcohol copolymer-methanol solution fed into the column to the methanol-water mixed vapor thereinto was 1.77. With the mixed vapor under a pressure of 1.1 kg/cm$^2$, methanol in the copolymer solution was substituted with water. Through the process, the ethylene-vinyl alcohol copolymer did not gel in the plate column, and the intended ethylene-vinyl alcohol copolymer solution was continuously taken out of the column. After the solvent therein was substituted with water, the ethylene-vinyl alcohol copolymer concentration in the resulting solution was 41.6% by weight, and the ratio by weight of water/methanol in the solution was 1.36.

Comparative Example 1

The same paste as in Example 1 was fed into a flush tank, and a methanol-water mixed vapor was fed thereinto through its bottom. The water content, Y, of the mixed vapor was 45% by weight; and the ratio by weight, X, of the ethylene-vinyl alcohol copolymer-methanol solution fed into the tank to the methanol-water mixed vapor thereinto was 0.85. With the mixed vapor under a pressure of 1.1 kg/cm$^2$, methanol in the copolymer solution was substituted with water. After the solvent therein was substituted with water, the ethylene-vinyl alcohol copolymer concentration in the resulting solution was 42.2% by weight, but a part of the ethylene-vinyl alcohol copolymer gelled in the tank.

Comparative Example 2

The same paste as in Example 1 was fed into a flush tank, and a methanol-water mixed vapor was fed thereinto through its bottom. The water content, Y, of the mixed vapor was 35% by weight; and the ratio by weight, X, of the ethylene-vinyl alcohol copolymer-methanol solution fed into the tank to the methanol-water mixed vapor thereinto was 0.92. With the mixed vapor under a pressure of 1.1 kg/cm$^2$, methanol in the copolymer solution was substituted with water. After the solvent therein was substituted with water, the ethylene-vinyl alcohol copolymer concentration in the resulting solution was 39.8% by weight, but a part of the ethylene-vinyl alcohol copolymer gelled in the tank.

Comparative Example 3

The same paste as in Example 1 was fed into a flush tank, and a methanol-water mixed vapor was fed thereinto through its bottom. The water content, Y, of the mixed vapor was 40% by weight; and the ratio by weight, X, of the ethylene-vinyl alcohol copolymer-methanol solution fed into the tank to the methanol-water mixed vapor thereinto was 1.21. With the mixed vapor under a pressure of 1.1 kg/cm$^2$, methanol in the copolymer solution was substituted with water. After the solvent therein was substituted with water, the ethylene-vinyl alcohol copolymer concentration in the resulting solution was 39.6% by weight, but a part of the ethylene-vinyl alcohol copolymer gelled in the tank.

Comparative Example 4

The same paste as in Example 1 was fed into a flush tank, and a methanol-water mixed vapor was fed thereinto through its bottom. The water content, Y, of the mixed vapor was 50% by weight; and the ratio by weight, X, of the ethylene-vinyl alcohol copolymer-methanol solution fed into the tank to the methanol-water mixed vapor thereinto was 1.77. With the mixed vapor under a pressure of 1.1 kg/cm$^2$, methanol in the copolymer solution was substituted with water. After the solvent therein was substituted with water, the ethylene-vinyl alcohol copolymer concentration in the resulting solution was 39.3% by weight, but a part of the ethylene-vinyl alcohol copolymer gelled in the tank.

According to the method of the present invention described in detail hereinabove with reference to its preferred embodiments, a part of the solvent in an ethylene-vinyl alcohol copolymer solution can be continuously substituted with water to obtain a high-concentration ethylene-vinyl alcohol copolymer solution. Without gelling, an ethylene-vinyl alcohol copolymer solution having an increased concentration can be obtained efficiently according to the method of the invention, and the industrial usefulness of the invention is great.

While the invention has been described in detail and with reference to specific embodiments thereof, it will be apparent to one skilled in the art that various changes and modifications can be made therein without departing from the spirit and scope thereof.

Japanese application 2000-238364, filed Aug. 7, 2000, the benefit of whose foreign priority is claimed herein, is hereby incorporated by reference.

What is claimed is:

1. A method for processing a solution of ethylene-vinyl alcohol copolymer in a solvent other than water, which comprises feeding the solution and a solvent-water mixed vapor into a column vessel selected from a plate column and a packed column to thereby substitute a part of the solvent in the solution with water in the column vessel, wherein the column vessel is a plate column with at least two tiers therein or a packed column of which the height is equivalent to that of the plate column.

2. A method for processing a solution of ethylene-vinyl alcohol copolymer in a solvent other than water, which comprises feeding the solution and a solvent-water mixed vapor into a column vessel selected from a plate column and a packed column to thereby substitute a part of the solvent in the solution with water in the column vessel, wherein the solvent-water mixed vapor is fed into a lower part of the plate column or a lower part of the packed column, and the ethylene-vinyl alcohol copolymer solution is fed into the plate column or the packed column through a part higher than the part through which the mixed vapor is fed into the column.

3. The method for processing an ethylene-vinyl alcohol copolymer solution as claimed in claim 2, wherein the part through which the ethylene-vinyl alcohol copolymer solution is fed into the column vessel is at the 2nd to the 15th tier from the bottom of the plate column, or at a height of a packed column equivalent to that part of the plate column.

4. The method for processing an ethylene-vinyl alcohol copolymer solution as claimed in claim 3, wherein the part through which the ethylene-vinyl alcohol copolymer solution is fed into the column vessel is at the 4th to the 11th tier from the bottom of the plate column, or at a height of a packed column equivalent to that part of the plate column.

5. The method for processing an ethylene-vinyl alcohol copolymer solution as claimed in claim 2, wherein the ethylene-vinyl alcohol copolymer concentration in the solution to be fed into the column vessel is at least 15% by weight and not more than 50% by weight.

6. The method for processing an ethylene-vinyl alcohol copolymer solution as claimed in claim 5, wherein the ethylene-vinyl alcohol copolymer concentration in the solution to be fed into the column vessel is at least 20% by weight.

7. The method for processing an ethylene-vinyl alcohol copolymer solution as claimed in claim 6, wherein the ethylene-vinyl alcohol copolymer concentration in the solution to be fed into the column vessel is at least 25% by weight.

8. The method for processing an ethylene-vinyl alcohol copolymer solution as claimed in claim 5, wherein the ethylene-vinyl alcohol copolymer concentration in the solution to be fed into the column vessel is at most 40% by weight.

9. The method for processing an ethylene-vinyl alcohol copolymer solution as claimed in claim 8, wherein the ethylene-vinyl alcohol copolymer concentration in the solution to be fed into the column vessel is at most 35% by weight.

10. The method for processing an ethylene-vinyl alcohol copolymer solution as claimed in claim 2, wherein the ratio by weight of the amount of the ethylene-vinyl alcohol copolymer solution to be fed into the column vessel to that of the mixed vapor thereinto, is between 100/400 and 100/8.

11. The method for processing an ethylene-vinyl alcohol copolymer solution as claimed in claim 2, wherein the water content of the mixed vapor is at least 20% by weight and not more than 70% by weight.

12. The method for processing an ethylene-vinyl alcohol copolymer solution as claimed in claim 11, wherein the water content of the mixed vapor is not more than 60% by weight.

13. The method for processing an ethylene-vinyl alcohol copolymer solution as claimed in claim 2, wherein the ethylene content of the ethylene-vinyl alcohol copolymer is at least 3 mol % and not more than 70 mol %.

14. The method for processing an ethylene-vinyl alcohol copolymer solution as claimed in claim 13, wherein the ethylene content of the ethylene-vinyl alcohol copolymer is at least 20 mol %.

15. The method for processing an ethylene-vinyl alcohol copolymer solution as claimed in claim 14, the ethylene content of the ethylene-vinyl alcohol copolymer is at least 30 mol %.

16. The method for processing an ethylene-vinyl alcohol copolymer solution as claimed in claim 13, wherein the ethylene content of the ethylene-vinyl alcohol copolymer is not more than 60 mol %.

17. The method for processing an ethylene-vinyl alcohol copolymer solution as claimed in claim 16, wherein the ethylene content of the ethylene-vinyl alcohol copolymer is not more than 50 mol %.

18. The method for processing an ethylene-vinyl alcohol copolymer solution as claimed in claim 2, wherein the solvent in the ethylene-vinyl alcohol copolymer solution is an alcohol having a boiling point of not higher than 130° C.

19. The method for processing an ethylene-vinyl alcohol copolymer solution as claimed in claim 18, wherein the alcohol is methanol.

20. The method for processing an ethylene-vinyl alcohol copolymer solution as claimed in claim 2, wherein the solution has a concentration of ethylene-vinyl alcohol copolymer of from 25 to 35% by weight and is fed into the plate column at the 4th to 11th tier from its bottom or into the packed column at a height equivalent to that part of the plate column, and wherein the ratio by weight, X, of the amount of the ethylene-vinyl alcohol copolymer solution to be fed into the column vessel to that of the solvent-water mixed vapor thereinto, is within a range of $(-147.3/X)+103.7<Y<(-64.5/X)+128$ with $20\leq Y\leq 70$, in which Y (wt. %) indicates the water content of the mixed vapor.

21. The method for processing an ethylene-vinyl alcohol copolymer solution as claimed in claim 20, wherein $Y\leq 60$.

22. The method for processing an ethylene-vinyl alcohol copolymer solution as claimed in claim 1, wherein the solvent-water mixed vapor is fed into a lower part of the plate column or a lower part of the packed column, and the ethylene-vinyl alcohol copolymer solution is fed into the plate column or the packed column through a part higher than the part through which the mixed vapor is fed into the column.

23. The method for processing an ethylene-vinyl alcohol copolymer solution as claimed in claim 22, wherein the part through which the ethylene-vinyl alcohol copolymer solution is fed into the column vessel is at the 2nd to the 15th tier from the bottom of the plate column, or at a height of a packed column equivalent to that part of the plate column.

24. The method for processing an ethylene-vinyl alcohol copolymer solution as claimed in claim 23, wherein the part through which the ethylene-vinyl alcohol copolymer solution is fed into the column vessel is at the 4th to the 11th tier from the bottom of the plate column, or at a height of a packed column equivalent to that part of the plate column.

25. The method for processing an ethylene-vinyl alcohol copolymer solution as claimed in claim 1, wherein the ethylene-vinyl alcohol copolymer concentration in the solution to be fed into the column vessel is at least 15% by weight and not more than 50% by weight.

26. The method for processing an ethylene-vinyl alcohol copolymer solution as claimed in claim 25, the ethylene-vinyl alcohol copolymer concentration in the solution to be fed into the column vessel is at least 20% by weight.

27. The method for processing an ethylene-vinyl alcohol copolymer solution as claimed in claim 26, the ethylene-vinyl alcohol copolymer concentration in the solution to be fed into the column vessel is at least 25% by weight.

28. The method for processing an ethylene-vinyl alcohol copolymer solution as claimed in claim 25, wherein the ethylene-vinyl alcohol copolymer concentration in the solution to be fed into the column vessel is at most 40% by weight.

29. The method for processing an ethylene-vinyl alcohol copolymer solution as claimed in claim 28, the ethylene-vinyl alcohol copolymer concentration in the solution to be fed into the column vessel is at most 35% by weight.

30. The method for processing an ethylene-vinyl alcohol copolymer solution as claimed in claim 1, the ratio by weight of the amount of the ethylene-vinyl alcohol copolymer solution to be fed into the column vessel to that of the mixed vapor thereinto, is between 100/400 and 100/8.

31. The method for processing an ethylene-vinyl alcohol copolymer solution as claimed in claim 1, wherein the water content of the mixed vapor is at least 20% by weight and not more than 70% by weight.

32. The method for processing an ethylene-vinyl alcohol copolymer solution as claimed in claim 31, wherein the water content of the mixed vapor is not more than 60% by weight.

33. The method for processing an ethylene-vinyl alcohol copolymer solution as claimed in claim 1, wherein the ethylene content of the ethylene-vinyl alcohol copolymer is at least 3 mol % and not more than 70 mol %.

34. The method for processing an ethylene-vinyl alcohol copolymer solution as claimed in claim 33, wherein the ethylene content of the ethylene-vinyl alcohol copolymer is at least 20 mol %.

35. The method for processing an ethylene-vinyl alcohol copolymer solution as claimed in claim 34, wherein the ethylene content of the ethylene-vinyl alcohol copolymer is at least 30 mol %.

36. The method for processing an ethylene-vinyl alcohol copolymer solution as claimed in claim 33, wherein the ethylene content of the ethylene-vinyl alcohol copolymer is not more than 60 mol %.

37. The method for processing an ethylene-vinyl alcohol copolymer solution as claimed in claim 36, wherein the ethylene content of the ethylene-vinyl alcohol copolymer is not more than 50 mol %.

38. The method for processing an ethylene-vinyl alcohol copolymer solution as claimed in claim 1, wherein the solvent in the ethylene-vinyl alcohol copolymer solution is an alcohol having a boiling point of not higher than 130° C.

39. The method for processing an ethylene-vinyl alcohol copolymer solution as claimed in claim 38, wherein the alcohol is methanol.

40. The method for processing an ethylene-vinyl alcohol copolymer solution as claimed in claim 1, wherein the solution has a concentration of ethylene-vinyl alcohol copolymer of from 25 to 35% by weight and is fed into the plate column at the 4th to 11th tier from its bottom or into the packed column at a height equivalent to that part of the plate column, and wherein the ratio by weight, X, of the amount of the ethylene-vinyl alcohol copolymer solution to be fed into the column vessel to that of the solvent-water mixed vapor thereinto, is within a range of $(-147.3/X)+103.7<Y<(-64.5/X)+128$ with $20\leq Y\leq 70$, in which Y (wt. %) indicates the water content of the mixed vapor.

41. The method for processing an ethylene-vinyl alcohol copolymer solution as claimed in claim 40, wherein $Y\leq 60$.

* * * * *